United States Patent
Bourgeois et al.

(10) Patent No.: US 10,516,669 B2
(45) Date of Patent: Dec. 24, 2019

(54) METHODS AND SYSTEMS RELATING TO NETWORK BASED STORAGE

(71) Applicant: HUBSTOR INC., Ottawa (CA)

(72) Inventors: Geoffrey Bourgeois, Greely (CA); Greg Campbell, Greely (CA)

(73) Assignee: Hubstor Inc., Ottawa, Ontario (CA)

( * ) Notice: Subject to any disclaimer, the term of this patent is extended or adjusted under 35 U.S.C. 154(b) by 118 days.

(21) Appl. No.: 15/346,094

(22) Filed: Nov. 8, 2016

(65) Prior Publication Data

US 2017/0142113 A1    May 18, 2017

Related U.S. Application Data

(60) Provisional application No. 62/254,258, filed on Nov. 12, 2015.

(51) Int. Cl.
| | |
|---|---|
| *G06F 16/178* | (2019.01) |
| *G06F 3/06* | (2006.01) |
| *H04L 29/06* | (2006.01) |
| *H04L 29/08* | (2006.01) |

(52) U.S. Cl.
CPC ........... *H04L 63/10* (2013.01); *G06F 16/178* (2019.01); *G06F 3/0605* (2013.01); *G06F 3/0622* (2013.01); *G06F 3/0637* (2013.01); *H04L 67/1095* (2013.01); *H04L 67/1097* (2013.01)

(58) Field of Classification Search
CPC ............... G06F 16/178; H04L 63/10; H04L 67/1095–1097
See application file for complete search history.

(56) References Cited

U.S. PATENT DOCUMENTS

| | | | | |
|---|---|---|---|---|
| 7,275,244 | B1* | 9/2007 | Charles Bell | G06F 16/958 717/168 |
| 8,527,549 | B2* | 9/2013 | Cidon | G06F 16/178 707/802 |
| 2014/0026182 | A1* | 1/2014 | Pearl | G06F 21/60 726/1 |
| 2014/0115329 | A1* | 4/2014 | Sturonas | H04L 63/1466 713/165 |
| 2015/0319185 | A1* | 11/2015 | Kirti | H04L 63/1416 726/23 |

* cited by examiner

*Primary Examiner* — Daniel B Potratz
*Assistant Examiner* — D'Arcy Winston Straub
(74) *Attorney, Agent, or Firm* — Rosenberg, Klein & Lee

(57) ABSTRACT

Cloud storage provides for accessible interfaces, near-instant elasticity and scalability, multi-tenancy, and metered resources within a framework of distributed resources acing to provide highly fault tolerant solutions with high data durability. However, cloud storage has drawbacks and limitations which are addressed by:
a graphical user interface which portrays content ingested from third party sources in its original folder contexts and determines what folder locations each knowledge worker will see in the interface rather than how they are uploaded onto the remote storage;
a centralized determination of incremental ingestion of changes from a data source to a cloud storage repository that should be written; and
a responsive method of obtaining query results for policies that evaluate one or more clauses against a cloud storage repository containing large data sets; and
a means of maintaining/refreshing of statistics for large data sets within a cloud storage repository.

12 Claims, 9 Drawing Sheets

METHODS AND SYSTEMS RELATING TO NETWORK BASED STORAGE

CROSS-REFERENCE TO RELATED APPLICATIONS

This patent application claims the benefit of U.S. Provisional Patent Application 62/254,258 filed Nov. 12, 2015, entitled "Methods and Systems Relating to Network Based Storage", the entire contents of which are incorporated by reference.

FIELD OF THE INVENTION

This invention relates to network and/or cloud based storage and more particularly to methods of writing data to network and/or cloud storage and of providing efficient human interfaces for knowledge workers within network and/or cloud storage solutions.

BACKGROUND OF THE INVENTION

Cloud storage has evolved in the last decade from a model being presented as a solution to evolving data storage needs to the main storage form for many enterprises, organizations and individuals. In 2013 over 1,000 Petabytes of data were stored in the cloud, i.e. over 1,000,000,000 Gigabytes. By 2014 a single social network, Facebook™, alone stored approximately 400 Petabytes of data. Cloud storage represents a data storage model where data is stored in logical pools, the physical storage spans multiple servers and often locations, and the physical environment is typically owned and managed by a hosting company and/or service provider. These cloud storage providers are responsible for keeping the data available and accessible, and the physical environment protected and running. People and organizations buy or lease storage capacity from the providers to store user, organization, or application data. Cloud storage services may be accessed through a co-located cloud computer service, a web service application programming interface (API) or by applications that utilize the API, such as cloud desktop storage, a cloud storage gateway or Web-based content management systems.

Accordingly, cloud storage is based on a highly virtualized infrastructure and is like the broader concept of cloud computing in terms of accessible interfaces, near-instant elasticity and scalability, multi-tenancy, and metered resources. Cloud storage, a form of network based storage, is made up of many distributed resources, but still acts as one (often referred to as federated storage clouds), is highly fault tolerant through redundancy and distribution of data, highly durable through the creation of versioned copies, and generally what is known as "eventually consistent" with regard to data replicas.

However, cloud storage also comes with some drawbacks and limitations in how this information is uploaded (or ingested) and how a user or users access this information subsequently in comparison to the management tools etc. that the user is typically used to using. Whilst tools such as Microsoft One Drive offer individual users functionality similar to Microsoft Explorer for managing files and integrate to software applications such as Microsoft's own Word, Excel and PowerPoint there is a lack of automated tools for managing tens, hundreds and thousands of users within enterprises and organizations. Migrating to the cloud for these is a massive undertaking.

Accordingly, it would be beneficial to provide knowledge workers, e.g. users, with a human interface, e.g. a graphical user interface on their electronic devices, to the data ingested from third-party systems that presents the data organized in the original folder contexts and determines what folder locations each knowledge worker will see in the interface.

It would be further beneficial for organizations, enterprises, and knowledge workers to have access to tools for the incremental ingestion of changes from a data source to a cloud storage repository. It would be further beneficial for the method of determining what needs to be written to the cloud storage repository from the data sources to b centralized.

In many instances user activities with cloud storage can result in the millions, hundreds of millions and even billions of items. Accordingly, it would be beneficial to provide knowledge works with a means for efficient querying and maintenance of statistics for large data sets. It would be further beneficial for this to be a responsive and computationally light method of refreshing statistics and obtaining query results for policies that evaluate one or more clauses against a cloud storage repository and provide statistics on their resulting data set.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to address limitations within the prior art relating to network and/or cloud based storage and more particularly to methods of writing data to network and/or cloud storage and of providing efficient human interfaces for knowledge workers within network and/or cloud storage solutions.

In accordance with an embodiment of the invention there is provided a method or computer readable instructions stored upon a non-volatile non-transitory storage medium which when executed by a microprocessor perform the method, the method comprising linking a cloud storage repository to a user directory service and maintaining a record of user identities, wherein when a data source connector traverses and captures data from a third-party system it submits access control information to the cloud storage repository it at least one of resolves all access control members to user identities and stores this information relationally within the record of user identities and updates the user directory service.

In accordance with an embodiment of the invention there is provided a graphical user interface comprising computer readable instructions stored upon a non-volatile non-transitory storage medium which when executed by a microprocessor perform a method, the method comprising:
resolving access control information to knowledge worker identities;
assembling data map reports for each knowledge workers;
recording knowledge workers' selections for folder locations to pin; and
synchronizing changes and updating the data map reports as changes are captured from third-party systems.

In accordance with an embodiment of the invention there is provided a system comprising:

a first module for resolving access control information to knowledge worker identities with respect to a plurality of knowledge workers accessing data stored upon a remote storage system;

a second module for generating and assembling data map reports for each knowledge worker of the plurality of knowledge workers;

a third module for recording knowledge workers' selections of folder locations; and a fourth module synchronizing changes and updating the data map reports as changes are captured from third-party systems.

In accordance with an embodiment of the invention there is provided a computer-implemented method for centrally managing delta comparisons and ingestion logic with respect to a data storage network, the method comprising the steps of:

providing a network ingestion service which queries a data source connector of a plurality of data source connectors;

receiving a response from the data source connector of the plurality of data source connectors;

evaluating with the network ingestion service the response from the data source connector of the plurality of data source connectors against a plurality of policies and a system of record to determine differences;

transmitting to the data source connector of the plurality of data source connectors references to items evaluated to have differences;

capturing with the data source connector of the plurality of data source connectors the items associated with the references;

storing within the data storage network the captured items; and updating the system of record.

In accordance with an embodiment of the invention there is provided a data source connector associated with a repository of data, the data source connector:

interfacing with the repository of data;

handling calls from a data storage network calls for content; wherein the data storage network supports at least one of directly and indirectly through other cloud storage repositories all of the policies and other capture logic, the user interface(s), and associated system(s) of record.

In accordance with an embodiment of the invention there is provided a method of managing change to data within a data storage network comprising:

establishing at least a policy of a plurality of policies, each policy having associated with it a data set;

segmenting the data set of the policy of the plurality of policies into a series of policy blocks, wherein each policy block represents logical groupings of item versions from the policy's data set and is stored as a separate record in a policy block table.

In accordance with an embodiment of the invention there is provided a method for transferring data to remote storage comprising:

identifying content for transfer within a connector service in execution upon a client computer;

obtaining with the connector service a time-limited write-only token from a remote application;

writing the identified content to a staging container identified by the remote application using the time-limited write-only token;

transferring with the remote application the identified content from the staging container to an archive container; and deleting the identified content from the staged container upon the completion of the transfer from the staging container to the archive container.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figs., wherein.

DETAILED DESCRIPTION

Figure 1:
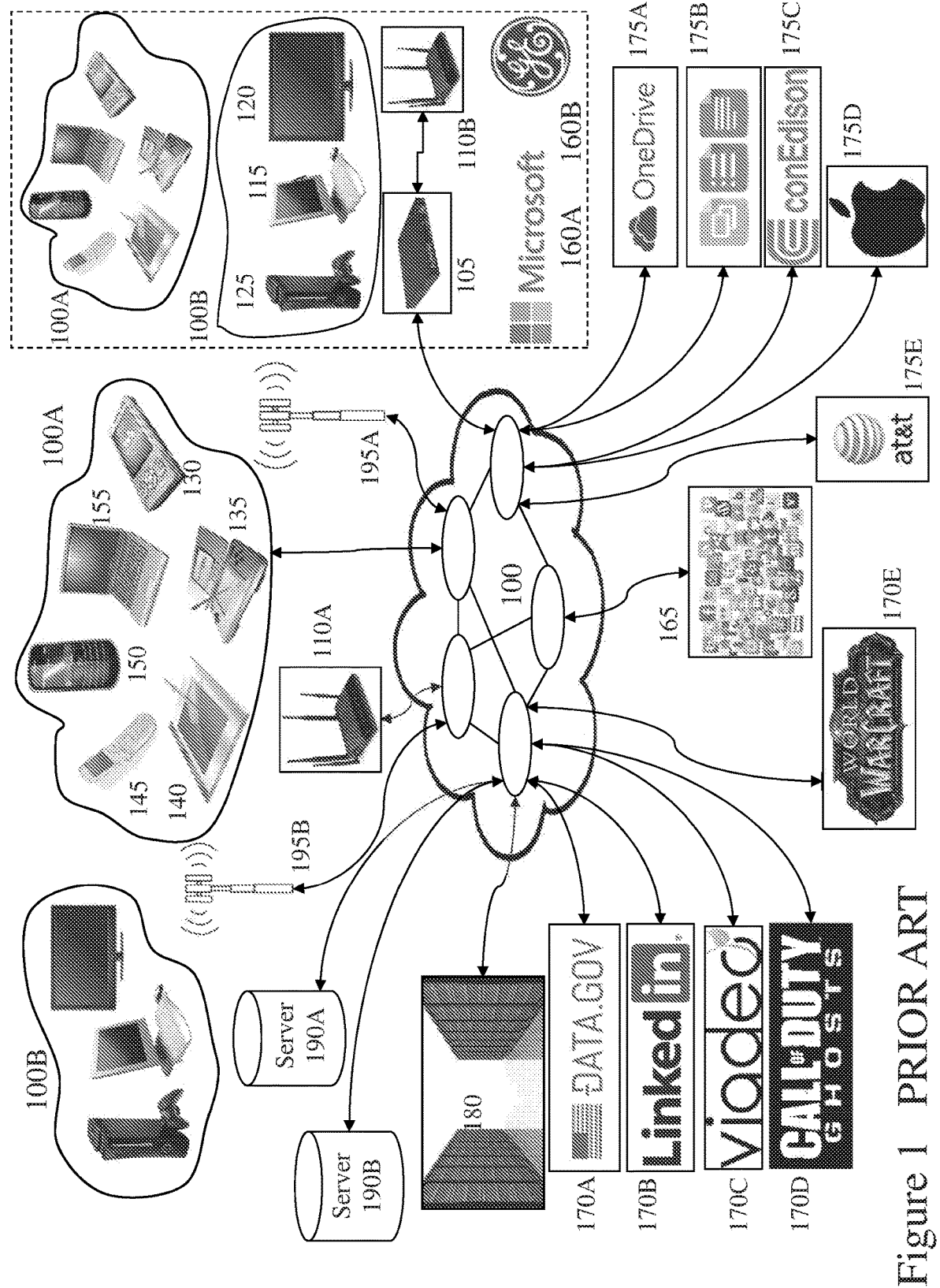
FIG. 1 depicts a network environment within which embodiments of the invention may be employed.

The present invention is directed to network and/or cloud based storage and more particularly to methods of writing data to network and/or cloud storage and of providing efficient human interfaces for knowledge workers within network and/or cloud storage solutions.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

A "social network" or "social networking service" as used herein may refer to, but is not limited to, a platform to build social networks or social relations among people who may, for example, share interests, activities, backgrounds, or real-life connections. This includes, but is not limited to, social networks such as U.S. based services such as Facebook, Google+, Tumblr and Twitter; as well as Nexopia, Badoo, Bebo, VKontakte, Delphi, Hi5, Hyves, iWiW, Nasza-Klasa, Soup, Glocals, Skyrock, The Sphere, StudiVZ, Tagged, Tuenti, XING, Orkut, Mxit, Cyworld, Mixi, renren, weibo and Wretch.

"Social media" or "social media services" as used herein may refer to, but is not limited to, a means of interaction among people in which they create, share, and/or exchange information and ideas in virtual communities and networks. This includes, but is not limited to, social media services relating to magazines, Internet forums, weblogs, social blogs, microblogging, wikis, social networks, podcasts, photographs or pictures, video, rating and social bookmarking as well as those exploiting blogging, picture-sharing, video logs, wall-posting, music-sharing, crowdsourcing and voice over IP, to name a few. Social media services may be classified, for example, as collaborative projects (for example, Wikipedia); blogs and microblogs (for example, Twitter™); content communities (for example, YouTube and DailyMotion); social networking sites (for example, Facebook™); virtual game-worlds (e.g., World of Warcraft™); and virtual social worlds (e.g. Second Life™).

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A 'third party' or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" (also referred to as a "knowledge worker") as used herein may refer to, but is not limited to, an individual or group of individuals who may, but not limited to, monitor, acquire, store, transmit, process and analyse either locally or remotely to the user data within one or more databases. This includes, but is not limited to, private individuals, employees of organizations and/or enterprises, members of community organizations, members of charity organizations, men, women, children, and teenagers. In its broadest sense the user may further include, but not be limited to, software systems, mechanical systems, robotic systems, android systems, etc. that may, but not limited to, monitor, acquire, store, transmitt, process and analyse either locally or remotely to the user data within one or more databases.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example hap://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

Reference to "content information" as used herein may refer to, but is not limited to, any combination of content features, content serving constraints, information derivable from content features or content serving constraints (referred to as "content derived information"), and/or information related to the content (referred to as "content related information"), as well as an extension of such information (e.g., information derived from content related information).

Reference to a "document" as used herein may refer to, but is not limited to, any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.). In the context of the Internet, a common document is a Web page. Web pages often include content and may include embedded information (such as meta-information, hyperlinks, etc.) and/or embedded instructions (such as Javascript, etc.). In many cases, a document has a unique, addressable, storage location and can therefore be uniquely identified by this addressable location such as a universal resource locator (URL) for example used as a unique address used to access information on the Internet.

Reference to a "human interface" or "user interface" as used herein may refer to, but is not limited to, any interface presenting to a type of interface that allows users to interact with electronic devices and/or systems directly and/or remotely. Today the most common user interface (UI) is a graphical user interface (GUI) that allows users to interact with electronic devices and/or systems through graphical icons and visual indicators such as secondary notation, as opposed to text-based interfaces, typed command labels or text navigation.

Reference to a "cloud" as used herein may refer to, but is not limited to, a model of ubiquitous, convenient, on-demand access to a shared pool of configurable computing resources via a network such as the Internet. As such the "cloud" may refer to an application, platform, and/or infrastructure remotely hosted from the user but accessible through a network. As such the cloud may refer to, but not be limited to, cloud computing, cloud servers, cloud (operating system), and cloud storage.

Reference to a "thick UI", "thick client" etc. as used herein may refer to, but is not limited to, an element, e.g. a UI or computer (client), which typically provides rich functionality independent of a central and/or remote server to which the UI and/or client relates.

Reference to a "thin UI", "thin client" etc. as used herein may refer to, but is not limited to, an element, e.g. a UI or computer (client), which typically has high dependency upon a central and/or remote server to which the UI and/or client relates in order to provide rich functionality.

Reference to a "Connector" as used herein may refer to, but is not limited to, a technology solution for connecting application servers and information systems etc. Accordingly, a "Connector" may define a software application compliant with a standard for connecting an application server to an information system or a software application forming part of another application in execution upon a server, client, information system etc. that operates by a defined standard a standard set of system-level contracts, for example between an application server and a resource adapter. Such connector standards including, but not limited to, Java Connector Architecture, Java Database Connectivity, and Java EE Connector Architecture.

Referring to FIG. 1 there is depicted a network environment 100 within which embodiments of the invention may be employed supporting remote storage systems, applications, and platforms (RS-SAPs) according to embodiments of the invention. Such RS-SAPs, for example supporting multiple channels and dynamic content. As shown first and second user groups 100A and 100B respectively interface to a telecommunications network 100. Within the representative telecommunication architecture, a remote central exchange 180 communicates with the remainder of a telecommunication service providers network via the network 100 which may include for example long-haul OC-48/OC-192 backbone elements, an OC-48 wide area network (WAN), a Passive Optical Network, and a Wireless Link. The central exchange 180 is connected via the network 100 to local, regional, and international exchanges (not shown for clarity) and therein through network 100 to first and second cellular APs 195A and 195B respectively which provide Wi-Fi cells for first and second user groups 100A and 100B respectively. Also connected to the network 100 are first and second Wi-Fi nodes 110A and 110B, the latter of which being coupled to network 100 via router 105. Second Wi-Fi node 110B is associated with first and second Enterprises 160A and 160B respectively, such as General Electric™ or Microsoft™ for example, within which other first and second user groups 100A and 100B are disposed. Second user group 100B may also be connected to the network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 and Bluetooth as well in an ad-hoc manner.

Also connected to the network 100 are Social Networks (SOCNETS) 165, cloud document service provider 170A, e.g. US Government open data portal Data.gov, first and second business networks 170B and 170C respectively, e.g. LinkedIn™ and Viadeo™, first to second online gaming communities 170D and 170E respectively, e.g. Call of Duty™ Ghosts and World of Warcraft™, as well as first and second servers 190A and 190B which together with others, not shown for clarity. Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T. Accordingly, a user employing one or more RS-SAPs may through their avatar and/or avatar characteristics interact with one or more such providers, enterprises, and third parties.

First and second servers 190A and 190B may host according to embodiments of the inventions multiple services associated with a provider of publishing systems and publishing applications/platforms (RS-SAPs); a provider of a SOCNET or Social Media (SOME) exploiting RS-SAP features; a provider of a SOCNET and/or SOME not exploiting RS-SAP features; a provider of services to PEDS and/or FEDS; a provider of one or more aspects of wired and/or wireless communications; an Enterprise 160 exploiting RS-SAP features; license databases; content databases; image databases; content libraries; customer databases; websites; and software applications for download to or access by FEDs and/or PEDs exploiting and/or hosting RS-SAP features. First and second primary content servers 190A and 190B may also host for example other Internet services such as a search engine, financial services, third party applications and other Internet based services.

Accordingly, a user may exploit a PED and/or FED within an Enterprise 160, for example, and access one of the first or second primary content servers 190A and 190B respectively to perform an operation such as accessing/downloading an application which provides RS-SAP features according to embodiments of the invention; execute an application already installed providing RS-SAP features; execute a web based application providing RS-SAP features; or access content. Similarly, a user may undertake such actions or others exploiting embodiments of the invention exploiting a PED or FED within first and second user groups 100A and 100B respectively via one of first and second cellular APs 195A and 195B respectively and first Wi-Fi nodes 110A.

Figure 2:
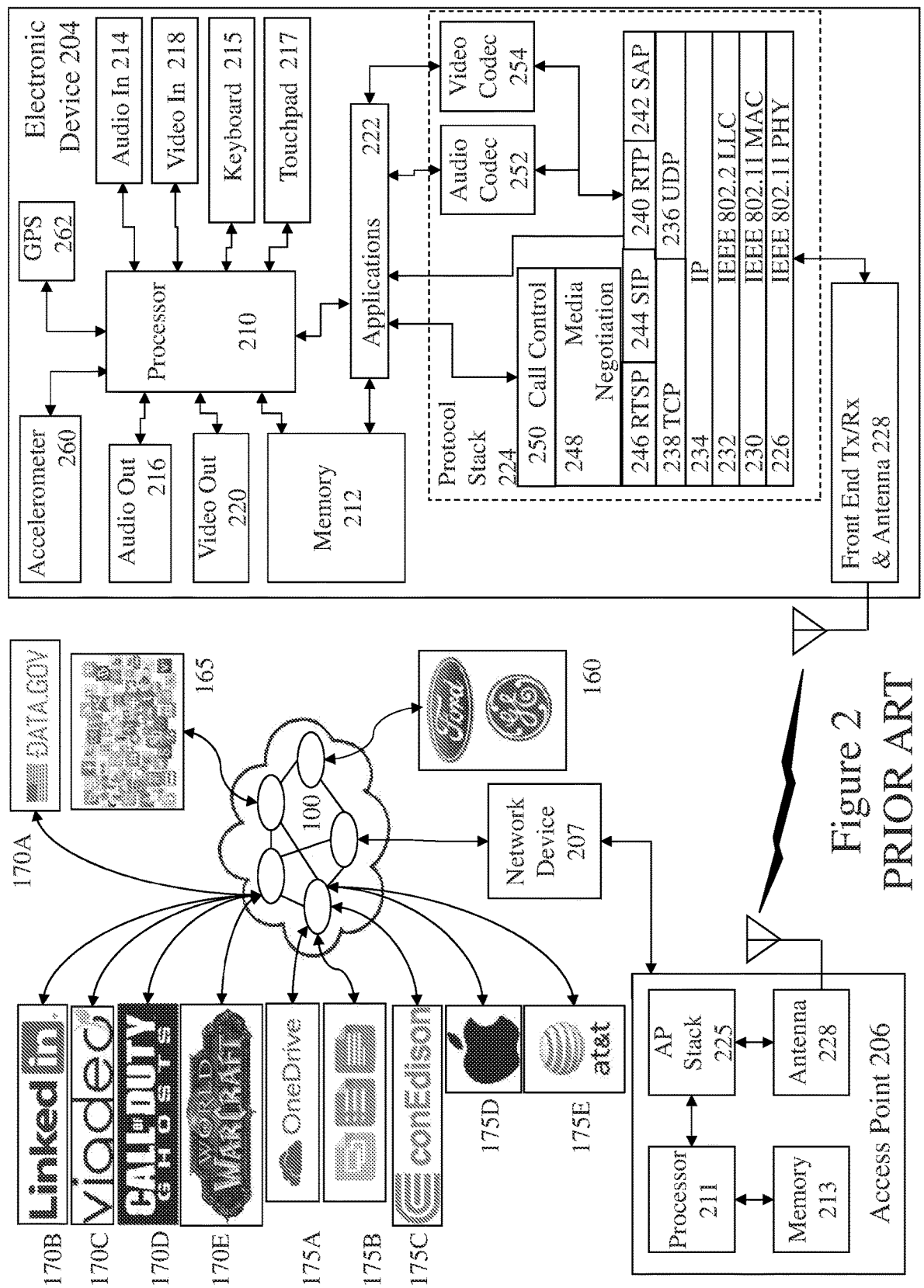
FIG. 2 depicts a wireless portable electronic device supporting communications to a network such as depicted in FIG. 1 and as supporting embodiments of the invention.

Now referring to FIG. 2 there is depicted an electronic device 204 and network access point 206 supporting RS-SAP features according to embodiments of the invention. Electronic device 204 may, for example, be a PED and/or FED and may include additional elements above and beyond those described and depicted. Also depicted within the electronic device 204 is the protocol architecture as part of a simplified functional diagram of a system 200 that includes an electronic device 204, such as a smartphone 155, an access point (AP) 206, such as first AP 110, and one or more network devices 207, such as communication servers, streaming media servers, and routers for example such as first and second servers 190A and 190B respectively. Network devices 207 may be coupled to AP 206 via any combination of networks, wired, wireless and/or optical communication links such as discussed above in respect of FIG. 1 as well as directly as indicated. Network devices 207 are coupled to network 100 and therein Social Networks (SOCNETS) 165, Also connected to the network 100 are Social Networks (SOCNETS) 165, cloud document service provider 170A, e.g. US Government open data portal Data.gov, first and second business networks 170B and 170C respectively, e.g. LinkedIn™ and Viadeo™, first to second online gaming communities 170D and 170E respectively, e.g. Call of Duty™ Ghosts and World of Warcraft™. Also connected are first and second cloud storage service providers 175A and 175B, e.g. Microsoft One Drive and Google docs, residential service provider 175C, e.g. ConEdison™, an online multimedia distributor 175D, e.g. Apple™, and telecom service provider 175E, e.g. AT&T.

The electronic device 204 includes one or more processors 210 and a memory 212 coupled to processor(s) 210. AP 206 also includes one or more processors 211 and a memory 213 coupled to processor(s) 210. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of processors 210 and 211 may be part of application specific integrated circuits (ASICs) or may be a part of application specific standard products (ASSPs). A non-exhaustive list of examples for memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic device 204 may include an audio input element 214, for example a microphone, and an audio output element 216, for example, a speaker, coupled to any of processors 210. Electronic device 204 may include a video input element 218, for example, a video camera or camera, and a video output element 220, for example an LCD display, coupled to any of processors 210. Electronic device 204 also includes a keyboard 215 and touchpad 217 which may for example be a physical keyboard and touchpad allowing the user to enter content or select functions within one of more applications 222. Alternatively, the keyboard 215 and touchpad 217 may be predetermined regions of a touch sensitive element forming part of the display within the electronic device 204. The one or more applications 222 that are typically stored in memory 212 and are executable by any combination of processors 210. Electronic device 204 also includes accelerometer 260 providing three-dimensional motion input to the process 210 and GPS 262 which provides geographical location information to processor 210.

Electronic device 204 includes a protocol stack 224 and AP 206 includes an AP stack 225. Within system 200 protocol stack 224 is shown as IEEE 802.11 protocol stack but alternatively may exploit other protocol stacks such as an Internet Engineering Task Force (IETF) multimedia protocol stack for example. Likewise, AP stack 225 exploits a protocol stack but is not expanded for clarity. Elements of protocol stack 224 and AP stack 225 may be implemented in any combination of software, firmware and/or hardware. Protocol stack 224 includes an IEEE 802.11-compatible PHY module 226 that is coupled to one or more Front-End Tx/Rx & Antenna 228, an IEEE 802.11-compatible MAC module 230 coupled to an IEEE 802.2-compatible LLC module 232. Protocol stack 224 includes a network layer IP module 234, a transport layer User Datagram Protocol (UDP) module 236 and a transport layer Transmission Control Protocol (TCP) module 238.

Protocol stack 224 also includes a session layer Real Time Transport Protocol (RTP) module 240, a Session Announcement Protocol (SAP) module 242, a Session Initiation Protocol (SIP) module 244 and a Real Time Streaming Protocol (RTSP) module 246. Protocol stack 224 includes a presentation layer media negotiation module 248, a call control module 250, one or more audio codecs 252 and one or more video codecs 254. Applications 222 may be able to create maintain and/or terminate communication sessions with any of devices 207 by way of AP 206. Typically, applications 222 may activate any of the SAP, SIP, RTSP, media negotiation and call control modules for that purpose. Typically, information may propagate from the SAP, SIP, RTSP, media negotiation and call control modules to PHY module 226 through TCP module 238, IP module 234, LLC module 232 and MAC module 230.

It would be apparent to one skilled in the art that elements of the electronic device 204 may also be implemented within the AP 206 including but not limited to one or more elements of the protocol stack 224, including for example an IEEE 802.11-compatible PHY module, an IEEE 802.11-compatible MAC module, and an IEEE 802.2-compatible LLC module 232. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by electronic device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Those skilled in the art will appreciate that computer systems described above in respect of FIGS. 1 and 2 and below in respect of FIGS. 3 to 9 are merely illustrative and are not intended to limit the scope of the present invention. Such computer systems may be connected to other devices that are not illustrated, including through one or more networks such as the Internet or via the World Wide Web (WWW). In addition, the functionality provided by the illustrated components may in some embodiments be combined in fewer components or distributed in additional components. Similarly, in some embodiments the functionality of some of the illustrated components may not be provided and/or other additional functionality may be available.

Further, whilst filters and software components, for example, are illustrated as being stored in memory while being used, these items or portions of them can be transferred between memory and other storage devices for purposes of memory management and data integrity. Similarly, items illustrated as being present on storage while being used can instead be present in memory and transferred between storage and memory. Alternately, in other embodiments some or all of the software modules may execute in memory on another device. Some or all of the described components or data structures may also be stored (e.g., as instructions or structured data) on a computer-readable medium (e.g., a hard disk, a memory, a network, or a portable article to be read by an appropriate drive), and can be transmitted as generated data signals (e.g., as part of a carrier wave) on a variety of computer-readable transmission mediums (e.g., wireless-based and wired/cable-based mediums). In addition, a "client" or "server" computing device may comprise any combination of hardware or software that can interact, including computers, network devices, internet appliances, PDAs, wireless phones, pagers, electronic organizers, television-based systems and various other consumer products that include inter-communication capabilities. Accordingly, the present invention may be practiced with other computer system configurations.

Within the following descriptions with respect to features and/or systems and/or processes according to embodiments of the invention there are three elements that recur:
1. The RS-RAP (e.g. HubStor™) cloud data repository, which houses the data stored within the cloud by the user, parties associated with a user, third parties etc.
2. A ConnectorService which is an operating system (e.g. Microsoft™ Windows™, Linux™, MAC OS™) service that runs processing for one or more connectors which are identify by machine name. Within an embodiment of the invention each ConnectorService connects to the RS-RAP (HubStor™) in the cloud and has its own "thick" UI which is used to configure all settings and all connectors used by the ConnectorService (wherein this configuration is still stored in the RS-RAP (e.g. HubStor™) cloud database.
3. Connector(s) which are individually each a single instance capable of scanning and synchronising a data source (i.e. Exchange, SharePoint, file servers, etc.) to the RS-RAP on a policy based basis. Accordingly, connectors are focused on providing very basic functionality whilst the requisite logic is in the ConnectorService. Within an embodiment of the invention the basic functionality the Connector needs to support includes, but is not limited to, get root location, get sub-locations, get items in location, and get an identifier, e.g. HSItem, for an item.

1. Centralized Cloud View of Entitlements in Third-Party Data Repositories

Accordingly, within embodiments of the invention there are provided systems and methods relating to a cloud storage repository's ability to provide knowledge workers with a human interface relating to data ingested from third-party systems which presents the ingested data organized within its original folder contexts. Further, the embodiments of the invention provide for a method of determining what folder locations the knowledge worker will see in the human interface, e.g. a graphical user interface (GUI). Such third-party systems may relate to an organization and/or a plurality of organizations, a service provider and/or service providers, an enterprise and/or plurality of enterprises and/or other third-party databases, data repositories, etc. The knowledge worker, e.g. user, may access the human interface upon a PED, FED, wearable device or other electronic device.

Within an embodiment of the invention a system implementing it comprises:
  a cloud storage repository;
  a user directory synchronization service;
  at least one data source connector; and
  a human interface.

Within an embodiment of the invention a system or software executing a method according to an embodiment of the invention operates by linking to one or multiple user directory services and maintaining a record of user identities. When a data source connector traverses and captures data from a third-party system it submits access control information to the cloud storage repository, which then resolves all access control members to user identities and stores this information relationally. The data source connector may also map the data captured from the third-party system to the user directory service.

Since it would be impractical to query this information ad hoc for potentially thousands of knowledge workers, the invention assembles and maintains a data map report for each knowledge worker in the system. Within the human interface the knowledge workers view the data map report and manually select any of the folder locations they wish to pin to their human interface for immediate visibility and access. As future synchronization between the third-party system and the cloud storage repository occurs the knowledge worker will automatically see the latest information for these pinned folder locations.

Accordingly, embodiments of the invention automatically recreate the content source logs and structure of content ingested and the user is then provided with a view of their access. Within the prior art storing content for access by a user is achieved by either caching data or searching. In the former the anticipated data required by the user is retrieved from the remote storage and cached in memory of the user's electronic device but this is expensive and difficult where the volumes of data are large. The latter is slow and expensive in respect of storing current searches etc. In contrast embodiments of the invention the system pushes some data to the data source connector and the user is then involved to associate certain locations as favorites, for example by entering a path as a favorite or running an initial search and then selecting favorites.

Figure 3:
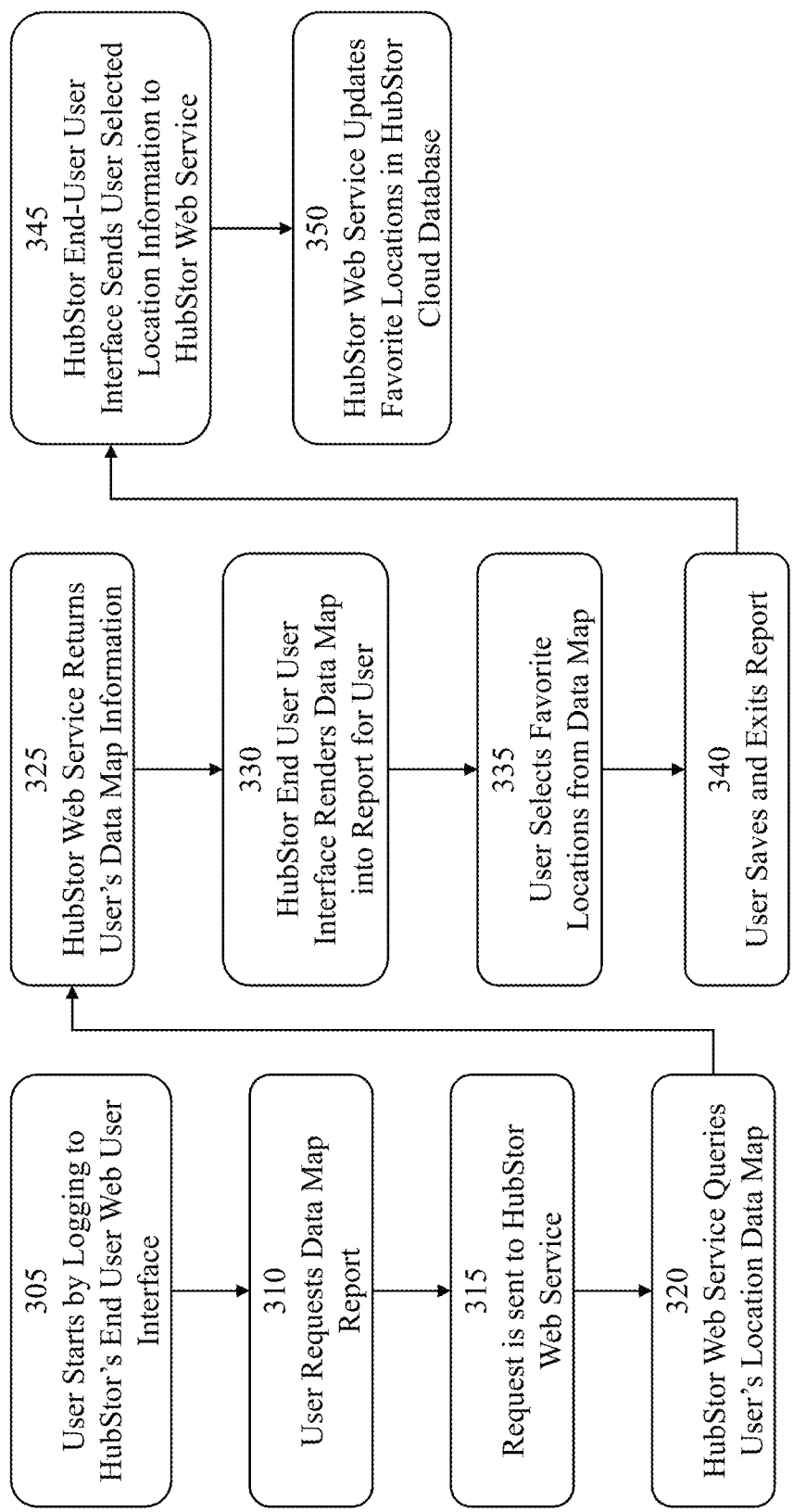
FIGS. 3 and 4 depict flow diagrams in respect of providing a knowledge worker with a cloud view of their entitlements from third party data sources according to an embodiment of the invention.
Figure 4:
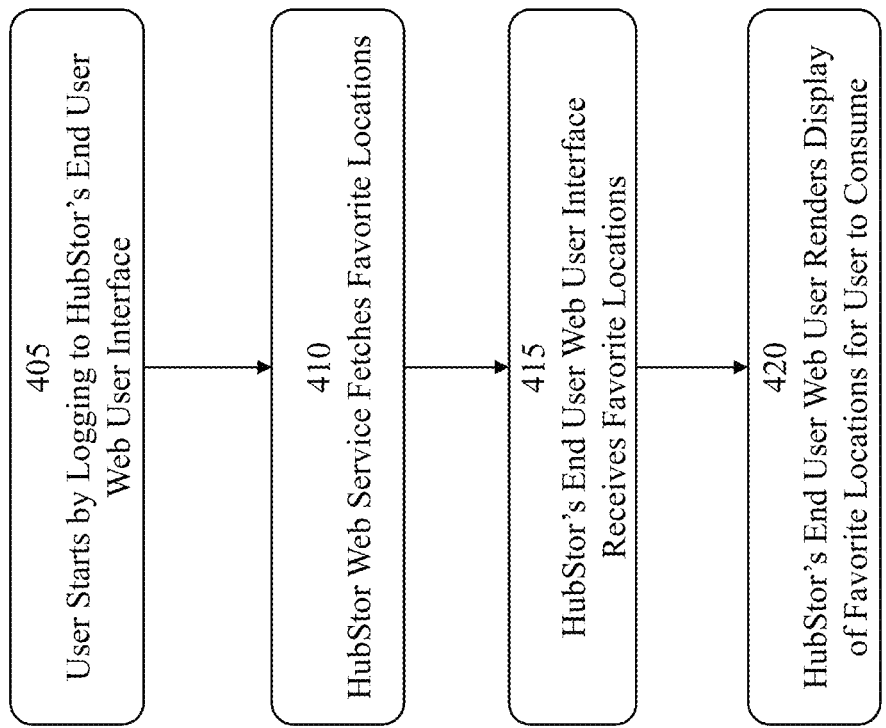

Now referring to FIGS. 3 and 4 there are depicted flow diagrams in respect of providing a knowledge worker with a cloud view of their entitlements from third party data sources according to an embodiment of the invention. Accordingly referring to FIG. 3 the process comprises steps 305 to 350 comprising:

Step 305 wherein a user seeking to access cloud based content logs into the RS-RAP's (e.g. Hub Stor™ as defined within the specification and figures) end user web based user interface (UI);

Step 310 wherein the user requests a data map report from the RS-RAP;

Step 315 where the user's request is sent to the RS-RAP (HubStor™, subsequently referred to as HubStors) web service;

Step 320 wherein the RS-RAP web service queries the user's location data map;

Step 325 wherein the RS-RAP web service returns the user's data map information;

Step 330 wherein the RS-RAP's end user UI renders the data map (data map information) into a report presented to the user;

Step 335 wherein the user selects one or more favorite locations from the rendered data map (which they may customise in terms of rendering to a format of their personal preference rather than a RS-RAP default option);

Step 340 wherein the user saves and exits the report provided by the RS-RAP end user UI;

Step 345 where the RS-RAP end user UI sends identification information relating to the user selected favorite locations to the RS-RAP web service; and Step 350 where the RS-RAP web service updates the favorite locations for the user within a RS-RAP cloud database.

Rendering the data map within the web service UI to the user may be through methods as known in the prior art as well as those subsequently envisioned for providing a user with a visualization of locations of individual files, folders, directories, servers, networks, etc. For example, today one such standard format is that provided through Microsoft™ Windows™ Explorer. Accordingly, generic connector framework, location and permissions information are captured from a data source by a Connector and submitted to Hub Stor in the cloud. The location and permissions information are essentially inherited or synchronized context relating to the Blobs (data content) written to the cloud archive. Accordingly, one of the uses of this context is to provide individual knowledge workers with a familiar view of their data, organized in the same folders as the user had them in the original data source. However, this would be very inefficient to subsequently query the full list of permissioned locations for a user each time they access their Web UI to view and/or access their Hub Stor cloud archive.

Accordingly, the process flow described and depicted in respect of FIG. 5 addresses that through the concept of favorites such that a user accessing their Web UI is presented with the result of a query to their favorite locations rapidly whilst either the remainder are built and displayed subsequently or held pending a user request to view/access. Such a methodology of minimizing data transfer upon an initial user access being particularly beneficial in mobile based user access.

Within embodiments of the invention the favorite location(s) concept for a given user is also exposed in the RS-RAP's Connector Application Programming Interface (API). Essentially a Connector has the ability to programmatically pass through the ConnectorService that a particular location or sub-location that it is submitting should be a favorite. Any locations marked by a Connector as a favorite will automatically appear for the user when they login to the End-User Web UI. For example, many locations such as a user's mailbox may be a favorite.

It would also be evident that in addition to user based definition of a favorite location that RS-RAP based analytics may establish a location or locations as favorite(s) based upon the user's access and usage patterns.

Upon logging into the End-User Web UI the process depicted in FIG. 4 comprising steps 405 to 420 may be executed, this process comprising:

Step 405 wherein the user starts by logging into the RS-RAP's End User Web UI;

Step 410 wherein the RS-RAP Web Service fetches favorite locations associated with the user;

Step 415 wherein the RS-RAP's End User Web UI receives the favorite locations; and Step 420 wherein the RS-RAP End User Web UI renders for display the favorite locations for the user to consume.

2. Incrementally Synchronizing Disparate Data Sources in a Cloud Storage Repository As noted supra it would be beneficial for knowledge workers to have access to an embodiment of the invention a system or software executing a method according to an embodiment of the invention which relates to the incremental ingestion of changes from a data source to a cloud storage repository. As noted, particularly in respect of enterprises, organizations, etc. for this to be a centralized method of determining what needs to be written to the cloud storage repository from the data source.

Within an embodiment of the invention a system implementing it comprises:
- a cloud ingestion service for a cloud repository, wherein the cloud repository comprises at least a database and a set of policies;
- an Application Programming Interface (API); and
- at least one data source connector.

Within an ingestion design according to the prior art a data source connector requires its own (i) user interface, (ii) record of what has been previously captured from the data source, and (iii) policy and other capture logic. In contrast, embodiments of the invention provide a generic interface that completely removes the connector's traditional requirements. Accordingly, the generic interface is agnostic in that it may be easily supported and/or installed within any electronic device, such as a PED, FED or wearable device, supporting the coded generic interface.

The invention operates through provisioning three elements within the data source connector, these being:
1) Acquisition of root level locations;
2) Acquisition of sub locations; and
3) Acquisition of a list of items.

Within embodiments of the invention the connector as a minimum functional set should interface with a data source and be able to handle for this data source any calls from a cloud ingestion service. Within the centralized model according to an embodiment of the invention then the cloud storage repository supports directly or through other cloud storage repositories all of the policies and other capture logic, the user interface(s), and associated system(s) of record.

Accordingly, within embodiments of the invention a software development kit (SDK) and/or a dynamic link library (DLL) are executed at the client side, e.g. the user's electronic device, to put the monitoring/maintenance engine on their system and then push the incremental changes to the remote network storage, e.g. cloud storage. The inventors refer to this as a data source connector SDK or "Connector SDK."

As such this is essentially an SDK with a synchronisation framework that includes an embedded data model with items and locations for incremental sync support. Accordingly, this API creates the embedded database (DB) behind the scenes and tracks all state information within it, i.e. the contents of each data source. Any Connector simply uses the API to pass information about what is currently in a data source's location and the API implementation does the rest including, but not limited to, find incremental differences, pushing incremental differences up to the RS-RAP cloud storage, and saving the updated information within the embedded database. This makes writing a capture agent low complexity as most of the logic is transparently provided such that the connector only needs to know how to crawl the target data source and pass certain information about the data to the API as all policy and cloud ingestion information is contained in the API.

Figure 5:
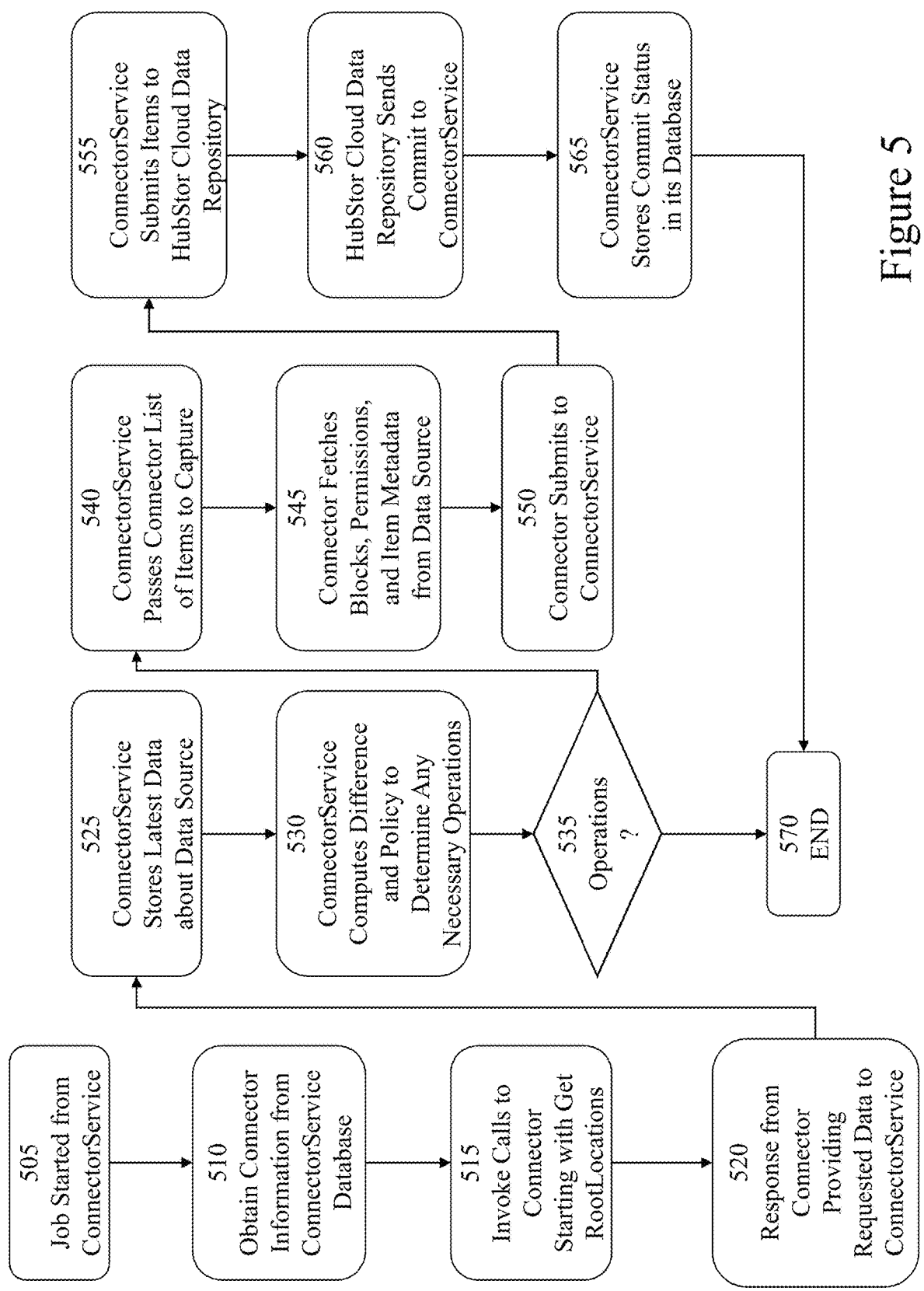
FIG. 5 depicts a flow diagram for incremental synchronised connector writing to a cloud data repository according to an embodiment of the invention.

Accordingly, referring to FIG. 5 there is depicted a flow diagram for incremental synchronised connector writing to a cloud data repository according to an embodiment of the invention comprising steps 505 to 570 respectively. These steps being
- Step 505 wherein the job is started from ConnectorService;
- Step 510 wherein the job obtains Connector Information from a ConnectorService Database;
- Step 515 wherein the job invoke calls to a Connector starting with "Get RootLocations";
- Step 520 wherein a response from the Connector is received providing the requested data to the ConnectorService;
- Step 525 wherein the ConnectorService stores the latest data with respect to the data source;
- Step 530 wherein the ConnectorService computes a difference and calls a policy to determine whether there are necessary operations or not; and
- Step 535 wherein the process based upon determining whether additional operations are required either proceeds forward to step 570 and ends for a negative determination or proceeds to steps 540 to 565 upon a positive determination.

Where the determination is positive that there are additional operations steps 540 to 565 comprise:
- Step 540 wherein the ConnectorService passes to the Connector a list of items to capture;
- Step 545 wherein the Connector fetches applicable data blocks, permissions, and item metadata from the data source;
- Step 550 where the Connector submits them to the ConnectorService;
- Step 555 where the ConnectorService submits the items to the RS-RAP cloud storage, e.g. HubStor™ Cloud Data Repository;
- Step 560 wherein the RS-RAP cloud storage sends a commit response to ConnectorService; and
- Step 565 where the ConnectorService stores the commit status in its database.

3. Method For Computing Statistics in a Massively Scalable Cloud Storage Repository Users of network based storage, and particularly cloud storage may, as a result of a single query or search, access millions, hundreds of millions and even billions of entries within the database(s) or repository(ies) accessed. Similarly, these records may be subject to thousands or millions of concurrent searches/queries. Accordingly, it is important for the cloud based storage to provide the users with an efficient means of initially querying and subsequently maintaining statistics for a large data set (item version counts in the multiple billions). Accordingly, embodiments of the invention provide for a responsive and computationally light method of refreshing statistics and getting query results for policies that evaluate one or more clauses against a cloud storage repository and provide statistics on their resulting data set.

Accordingly, embodiments of the invention may operate by segmenting a policy's data set into a series of policy blocks. These policy blocks representing logical groupings of item versions from the policy's data set, where each policy block is stored as a separate record in a policy block table. As a result, this initial segmentation supports subsequent computational work being performed incrementally.

When data in the cloud storage repository is removed or new data is added, or the policy's clauses are modified, new item versions are potentially added to or removed from a policy's data set when the policy is re-applied, thus making previous statistics obsolete. Accordingly, embodiments of the invention mark any policy blocks affected by item version changes as dirty blocks. An update statistics routine is then run against the dirty blocks to refresh their statistics, thus providing an incremental solution to computing statistics in a massively scalable cloud storage repository.

However, it would be evident to one of skill in the art that a central issue of how to execute and maintain these policies without disrupting the overall system and absorbing significant resources to them is addressed through the fracturing of the databases/policies etc. into policy blocks and then actually only analyzing those blocks that require it rather than everything.

Within the embodiments of the invention described below in respect of FIGS. 6 and 7 a policy is configured with two major attributes, a query and an action.

1) Query—defines the item version(s) that meet the policy and accordingly is based, typically, upon ItemVersion fields. Ultimately these are translated into a single, possibly complex, WHERE clause at policy evaluation time. This may also have potential additional elements, commonly referred to as joins, to other policies and/or data, relating to location/custodian restrictions, for example.

2) Actions—defines an optional list of actions (e.g. full-text index, PII detect, deletion, etc.) that are to be applied to item versions that match the query.

Within embodiments of the invention policies record overall statistics and aggregation statistics for the item versions that meet the query. A policy may exist strictly in order to track statistics for a subset of data, but often will exist to have associated actions to manipulate item version that meet the query.

Figure 6:
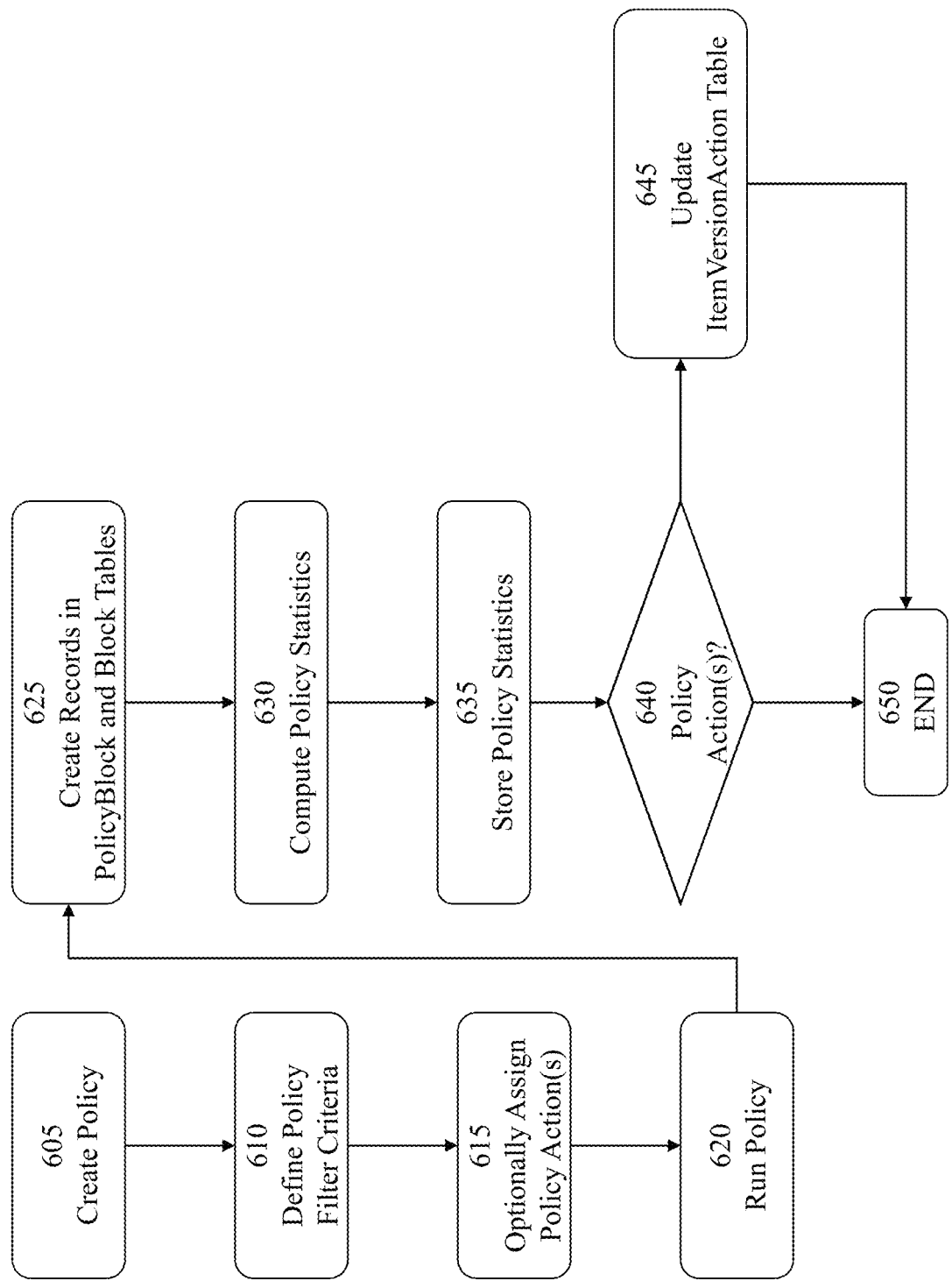
FIG. 6 depicts a flow diagram for initial policy creation and execution according to an embodiment of the invention.
Figure 7:
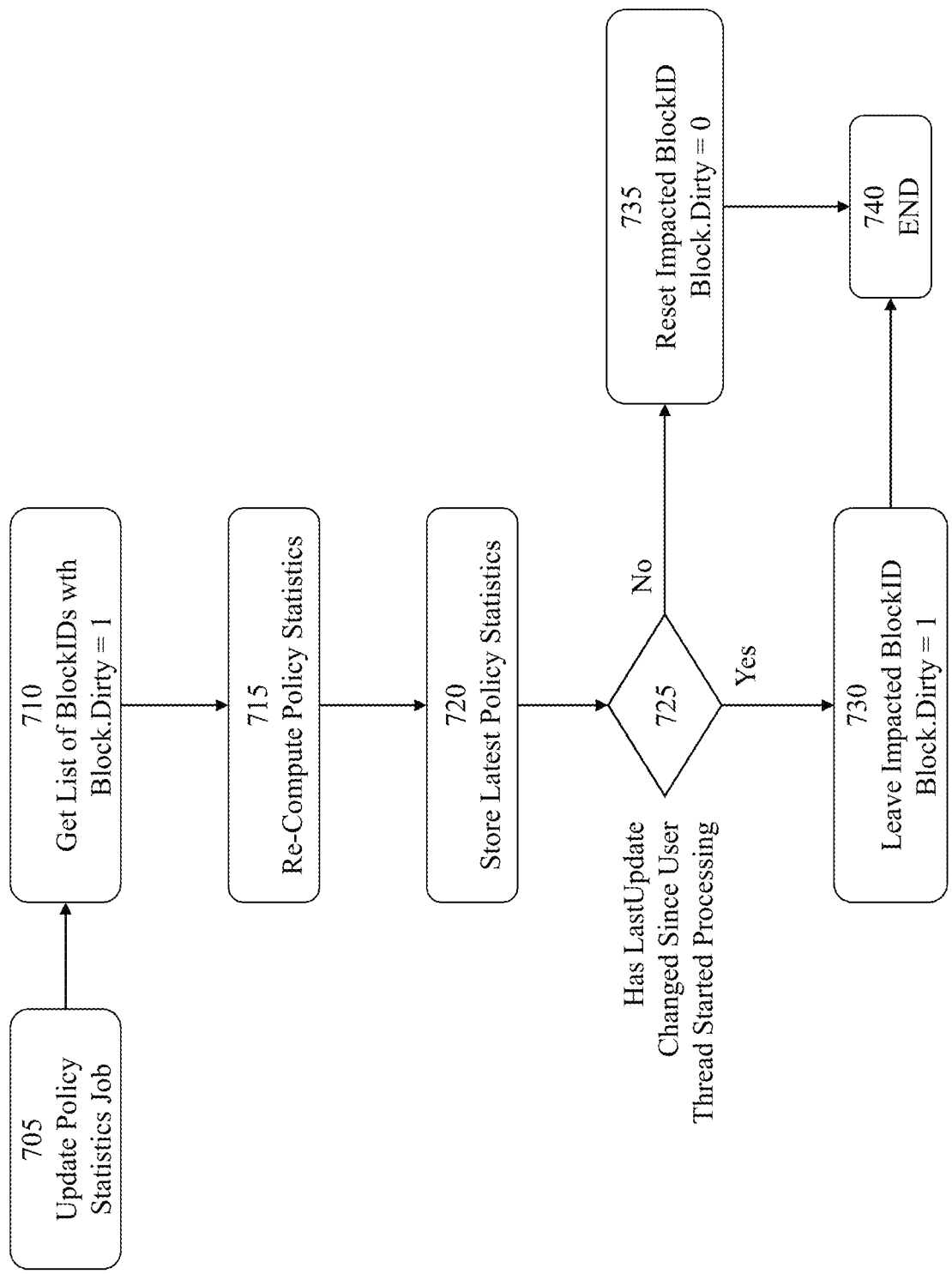
FIG. 7 depicts a flow diagram for incremental policy execution and update of statistics according to an embodiment of the invention.

Now referring to FIG. 6 there is depicted a flow diagram for initial policy creation and execution according to an embodiment of the invention comprising steps 605 to 650, wherein these comprise:

Step 605 where a policy is created;
Step 610 where any policy filter criteria for the policy are defined;
Step 615 wherein any policy actions are assigned to the policy;
Step 620 wherein the resulting policy is run;
Step 625 where based upon the policy execution records are created, such as within PolicyBlock and Block tables, relating to the policy execution;
Step 630 where statistics of the policy are computed;
Step 635 wherein the computed statistics for the policy are stored; and
Step 640 wherein a determination of additional actions is made.

Upon a negative determination the process proceeds to step 650 and ends, otherwise it proceeds to step 645 which comprises:

Step 645 wherein additional actions are performed, such as updating an ItemVersionAction table for example.

Subsequently a policy may be re-run wherein the RS-RAP must handle the instances of changes to the query result set, resulting from either changes in the corpus of data being queried or in the policy's query filter criteria. As policies record overall statistics and aggregation statistics for the item versions that meet the query, and the item counts may be very large (e.g. a billion items) it would be efficient to only update statistics incrementally where changes have occured. To accomplish the block mechanism according to embodiments of the invention was established. An embodiment of this is depicted in FIG. 7 for an incremental policy execution and update of statistics according to an embodiment of the invention comprising steps 705 to 740 respectively. As such the process steps comprise:

Step 705 wherein a trigger or user login or other action initiates an update policy statistics job execution;
Step 710 wherein the process establishes a list of BlockIDs with Block.Dirty=1;
Step 715 wherein the process re-computes the policy statistics;
Step 720 wherein the latest policy statistics are stored;
Step 725 wherein a determination is made as to whether the last update has changed since the user thread started processing.

Upon a positive determination in step 725 the process proceeds to step 730, wherein Step 730 wherein the process leaves impacted BlockIDs as Block.Dirty=1;
otherwise
Step 735 wherein the process resets impacted BlockIDs as Block.Dirty=0.

In each instance the process proceeds to step 740 and ends.

Within embodiments of the invention a dirty block is a region of ItemVersionIDs, a database of content with associated metadata relating to the content, in which at least one of the item versions has undergone a metadata change or location change. However, a block may be dirty because of a policy/action change (which forces a full evaluation to occur). Accordingly, in either of these scenarios the relevant Blocks are marked with a dirty status (Block.Dirty=1). Accordingly, when an update policy statistics process is run the process simply queries for a list of dirty blocks. If a block is dirty, Block.Dirty=1, then the actions and statistics for the block need to be recomputed for all policies. If, however, a block is clean, Block.Dirty=0, then there have been no changes affecting item versions in the block since the last time the block was processed and therefore the policy statistics and actions are up to date in this Block.

Additionally, the inventors use Block.LastUpdate in order to make the system thread-safe. Whenever anything changes to make a block dirty, Block.Dirty is simply set to 1 and the LastUpdate set to the current timestamp in the database. After a dirty block has been re-evaluated then Block.Dirty is set to 0 only if the LastUpdate hasn't changed since the worker thread started processing the given block. This means if a change is made to an item version in the block while it is being processed, it stays Dirty and must be processed again. In this manner no changes are missed. If a complete reevaluation of the policy is required, both for action queuing and statistics, then it is only necessary to simply mark all blocks as dirty.

4. Security/Container Key Based Isolation of Cloud Storage

Within the prior art in order for an application to send data to cloud storage the application possess and stores the API security key for the cloud storage container(s). It would be evident to one of skill in the art that this represents a significant security issue and according current approaches address this via applying the current best practices in encrypting the API security key. However, as evident from the prior art such practices have evolved continually as decryption/hacking techniques improve to respond to the improved security. Accordingly, the API security key becomes an increasing threat to security of data within the cloud data repository with time. In order to address this the inventors have established a methodology wherein the generic connector framework concepts described and depicted in respect of FIGS. 3 to 7 are brought forward to address security.

Figure 8:
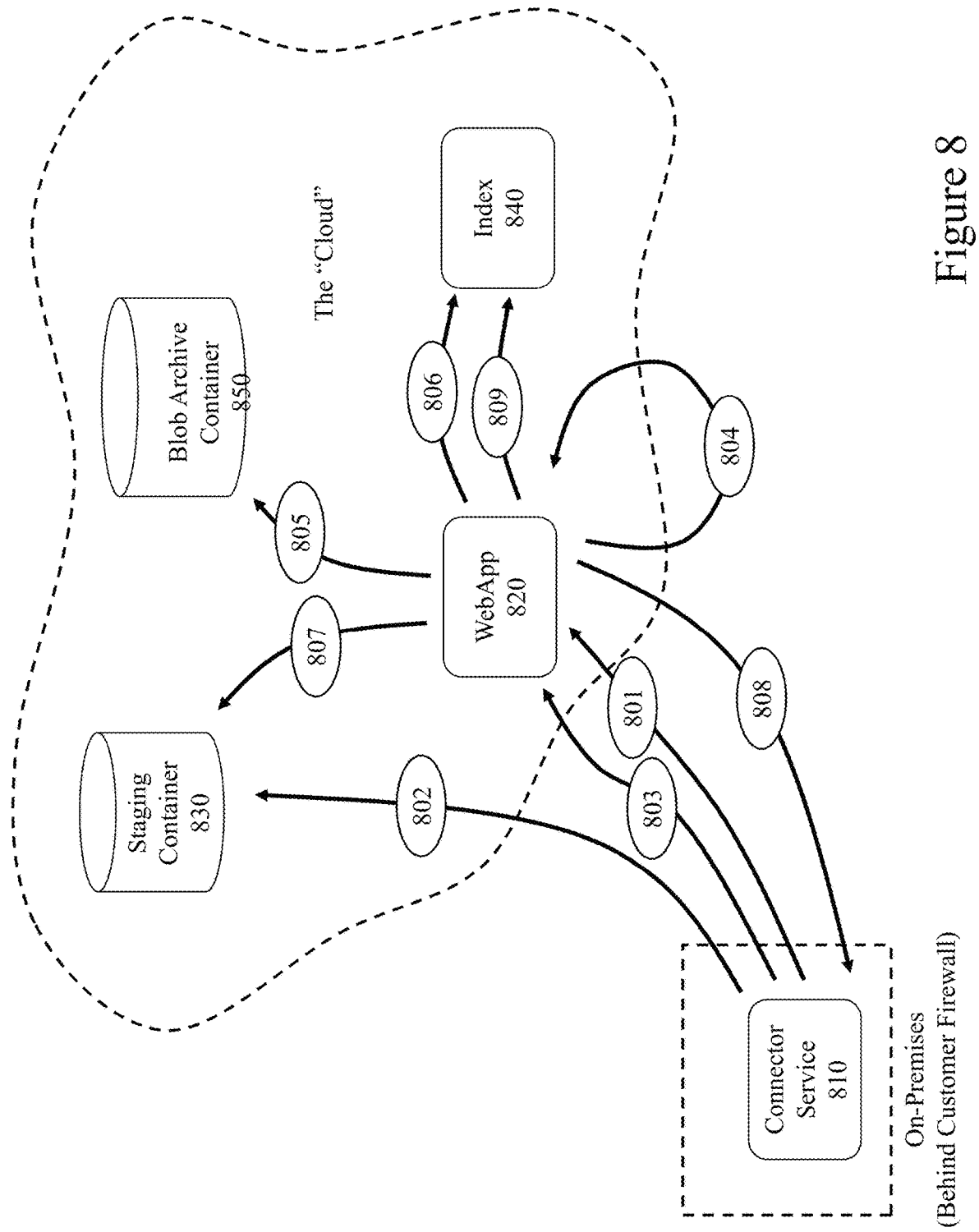
FIG. 8 depicts schematically a process for writing to cloud storage without exposing cloud storage API security according to an embodiment of the invention.

Referring initially to FIG. 8 there is depicted schematically a process for writing to cloud storage without exposing cloud storage API security according to an embodiment of the invention. As depicted the process comprises first to ninth flows 801 to 809 respectively from an on-premises ConnectorService 810 (assumed to be behind a firewall) with a WebApp 820 and a Staging Container 830 whilst some of the flows are then between the WebApp 820 and an Index 840, Blob Archive Container 850, and the Staging Container 830. Accordingly, these flows are:

Accordingly, considering first flow 801 in FIG. 8a, ConnectorService 810 obtains a time-limited write-only token to the Staging Container 830 from the WebApp 820. This, which ensures the ability to read any content in any of the containers (staging included) never leaves the WebApp 820 whilst the use of a separate Staging Container 830 also ensures that malicious writes do not affect the production blob within the Blob Archive Container and can be easily detected and deleted. Indeed, there is a separate maintenance task that periodically cleans up any lingering content in the Staging Container 830 that should not be there.

Second flow 802 where the ConnectorService 810 uses the time-limited write-only token to write the blobs to the Staging Container 830.

Third flow 803 wherein the ConnectorService 810 calls the WebApp 820 writing method for passing the blob locations in the Staging Container 830.

Fourth flow 804 where the WebApp 820 uses a MD5 hash, for example, of the blobs to check for duplicates and, if there is a duplicate, single instance stores the blob after doing a full byte-by-byte comparison to ensure no MD5 collision occurred. If there is a collision an error is logged and the write operation fails.

Fifth flow 805 wherein assuming the blob is unique it is copied into the Blob Archive Container 850 by the WebApp 820 and the MD5 hash of the written blob used to verify write integrity.

Sixth flow 806 wherein the WebApp 820 marks the relevant block as dirty within the Staging Container 830 (relating to the generic connector framework concepts described and depicted in respect of FIGS. 3 to 7).

Seventh flow 807 wherein the WebApp 820 deletes staged blobs within the Staging Container 830 which have been successfully committed to the Blob Archive.

Eighth flow 808 wherein the WebApp 820 returns the item/item version/blob identifiers to the ConnectorService 810.

Ninth flow 809 where subsequently the policy engine will detect the dirty block(s) and re-evaluate for the dirty block and, as appropriate take action against the item (i.e. full text index, update policy stats, etc.).

Figure 9:
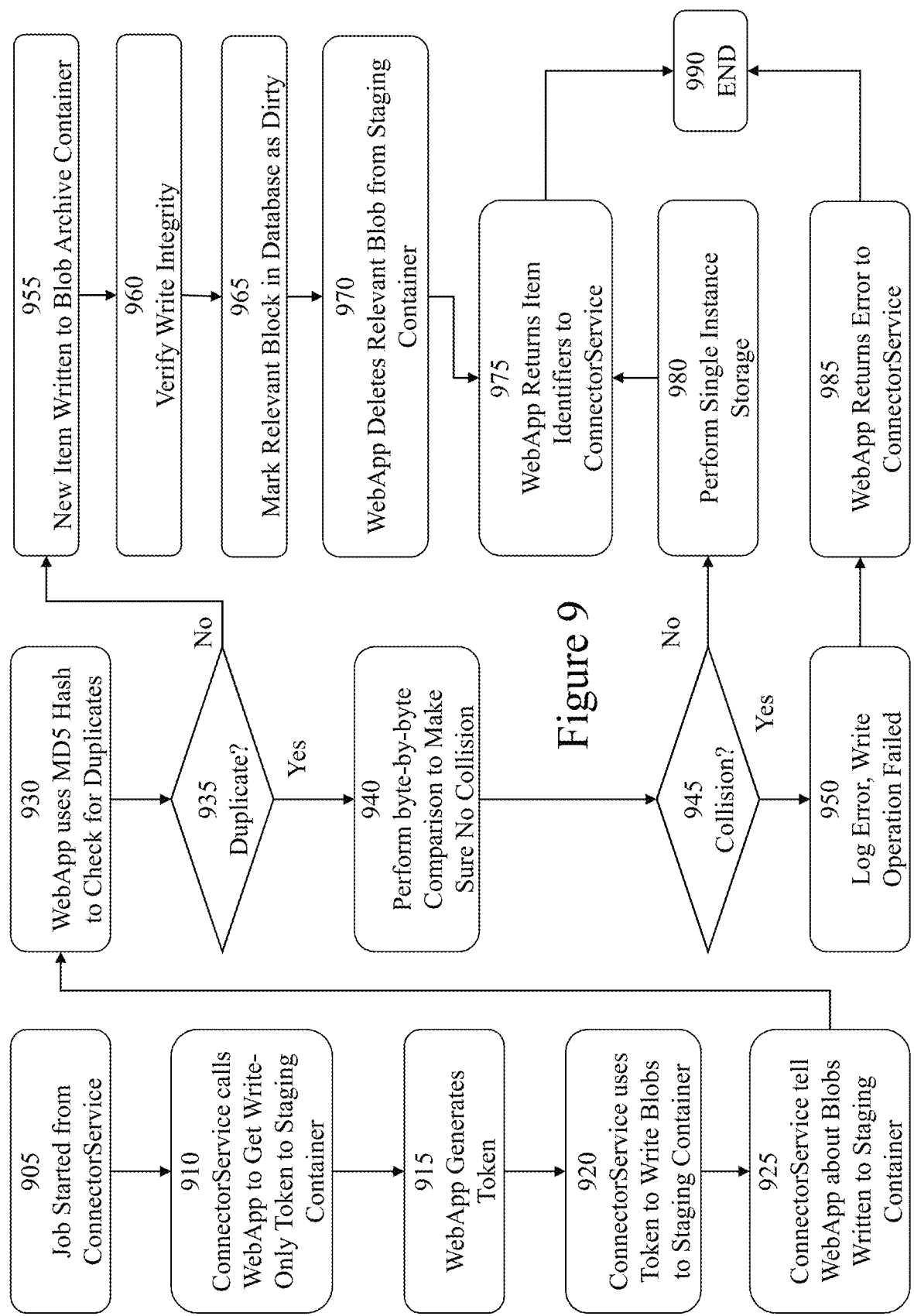
FIG. 9 depicts a flow diagram for writing to cloud storage without exposing cloud storage API security as depicted by the process in FIG. 8 according to an embodiment of the invention.

FIG. 9 there is depicted a flow diagram for writing to cloud storage without exposing cloud storage API security as depicted by the process in FIG. 8 according to an embodiment of the invention. As depicted the process comprises steps 905 to 990 respectively. As such the process steps comprise:
Step 905 wherein the job is started from the ConnectorService;
Step 910 wherein the ConnectorService calls the WebApp to obtain a write-only token to the Staging Container;
Step 915 where the WebApp Generates the Token and passes it to the ConnectorService;
Step 920 wherein the ConnectorService uses the received token to write blobs to the Staging Container;
Step 925 wherein the ConnectorService provides data to the WebApp concerning the Blobs written to the Staging Container;
Step 930 wherein the WebApp uses an MD5 Hash to check for duplicates;

In step 935 if the determination is negative then the process proceeds to steps 955 to 975 before ending at step 990. Considering steps 955 to 975 these comprise:
Step 955 wherein the new item is written to the Blob Archive Container;
Step 960 wherein the write integrity is verified;
Step 965 wherein the relevant blocks within the database are marked as dirty;
Step 970 wherein the WebApp proceeds to delete the relevant blobs from the Staging Container;
Step 975 wherein the WebApp returns the item identifiers to the ConnectorService.

From step 975 the process proceeds to step 990 and ends. If in step 935 the determination is positive, then the process proceeds to step 940 wherein a byte-by-byte comparison is performed to make sure there are no collisions. From step 940 the process proceeds to step 945 wherein a determination regarding the collision is made. If the determination is negative the process proceeds from step 945 to 980 and thereafter step 975 before ending in step 990. In step 980 the WebApp performs a single instance storage operation. If the determination is positive in step 945 then the process proceeds to step 950 and thereafter step 985 before ending in step 990. Steps 950 and 985 comprise:
Step 950 wherein the error is logged in respect of the failed write operation; and
Step 985 wherein the WebApp returns the error to the ConnectorService.

Within the preceding description in respect of FIGS. 3 to 9 and the Figures embodiments of the invention have been described from the viewpoint of a user accessing data/content that has been stored within a network and/or cloud storage system such as, for example, when an enterprise transfers its historical physical electronic data repositories into cloud based storage for a single location, single team, multiple locations, etc. and the user is accessing/storing/reading/writing content. Accordingly, the embodiments of the invention render a data map within the web service UI to the user through methods as known in the prior art as well as those subsequently envisioned for providing a user with a visualization of locations of individual files, folders, directories, servers, networks, etc. For example, today one such standard format is that provided through Microsoft™ Windows™ Explorer.

However, it would be evident to one of skill in the art that the content stored may already be visualized through a web based UI such as Microsoft Edge™ or Google Chrome™ for example, wherein a user may already have multiple cloud storage stores such as Microsoft OneDrive™ DropBox™, and Google Drive which they wish to view in a consolidated manner through a single web UI or actually consolidate within the cloud as well as virtually within the web UI. Similarly, embodiments of the invention may allow a user to exploit similar functionality in respect of "favorites" through a web based UI for a plurality of social networks and/or social media that the user accesses. For example, a user may wish to access on a regular basis elements of a corporate Facebook, a product support webpage, multiple supplier Facebook pages, Twitter accounts etc. but each time they login the system only accesses the "favorites" initially.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
providing a system comprising one or more microprocessors, one or more non-volatile non-transitory memories;
providing one or more network interfaces supporting electronic communications by the system to and from a first communications network and a second communications network; and
storing computer executable instructions within the one or more non-volatile non-transitory memories; wherein
the computer executable instructions when executed by the one or more microprocessors configure the system to:
store access control information from a plurality of data sources, the access control information acquired by one or more data source connectors traversing and capturing at least one of data and objects from the plurality of data sources accessible to the system which is stored within a cloud storage repository;
synchronize the access control information with a plurality of unique security identifiers associated with the plurality of data sources where each unique security identifier relates to either a specific user of a plurality of users associated with the captured data from the plurality of data sources or a specific subset of the plurality of users associated with the captured data from the plurality of data sources;
acquire and store user identity records from a plurality of user directory sources;
synchronize the user identity records acquired from the plurality of user directory sources;
manage the plurality of unique security identifiers;
query at least one of the ownership and access rights of an entity, the entity being one of a predetermined user of the plurality of users, a predetermined subset of the plurality of users, and a unique security identifier of the plurality of security identifiers; wherein
the querying correlates a mapping of access rights of the entity to at least one of one or more specific files contained within the captured data from the plurality of sources stored within the cloud storage repository and one or more specific objects within the objects within the captured objects from the plurality of sources stored within the cloud storage repository;
the plurality of data sources are connected to the first communications network; and
the cloud storage repository is connected to the second communications network.

2. The method according to claim 1, wherein the computer executable instructions when executed by the one or more microprocessors configure the system to:
link the cloud storage repository and the at least one of data and objects stored upon it with one or more user directory services; wherein
each user directory service maintains a record of each at least one of a user identity and a user group associated with the at least one of the data and objects for a predetermined data source of the plurality of data sources; and
each at least one of a user identity and a user group has one or more unique security identifiers associated with each record of the at least one of the user identity and the user group.

3. The method according to claim 1, wherein the computer executable instructions when executed by the one or more microprocessors configure the system to:
correlate the one or more security identifiers associated with a first user within the plurality of security identifiers associated with the plurality of data sources;
join the access control information associated with each security identifier of the one or more security identifiers for the first user within the plurality of security identifiers associated with the plurality of data sources; and
provide a second user with a global view of data ownership and data access rights across the plurality of data sources for the first user.

4. The method according to claim 1, wherein the computer executable instructions when executed by the one or more microprocessors configure the system to:
resolve one or more relationships between a user and at least one of the one or more security identifiers of the plurality of security identifiers associated with the user upon the plurality of data sources, one or more group membership of the user upon the plurality of data sources, and the at least one of the data and the objects to which the user has access.

5. The method according to claim 4, wherein the one or more relationships are established independent of the order in which the access control information and user identity information is collected by the system.

6. The method according to claim 1, wherein the computer executable instructions when executed by the one or more microprocessors configure the system to:
establish and maintain a queryable structure of user identities, their security identifier(s), their group memberships, and the access control information; and
provide a global view across the plurality of data sources and a plurality of data types of data stored within the plurality of data sources, the global view relating to at least one of the data and objects that at least one of a predetermined user, a predetermined group, and a predetermined security identifier at least one of owns and has access to within the cloud storage repository.

7. The method according to claim 1, wherein the computer executable instructions when executed by the one or more microprocessors configure the system to:
resolve the access control information for a knowledge worker of a plurality of knowledge workers, the knowledge worker associated with one or more knowledge worker identities of a plurality of knowledge worker identities upon the plurality of data sources;
assembling a data map report for the knowledge worker; and
synchronize changes captured from at least one of the plurality of data sources and one or more third party systems associated with the plurality of data sources; and
update the data map report for the knowledge worker of the plurality of knowledge workers.

8. The method according to claim 7, wherein the computer executable instructions when executed by the one or more microprocessors configure the system to:
- recording one or more selections made by the knowledge worker of the plurality of knowledge workers within the data map report, each selection relating to a folder location;
- upon receipt of a query associated with the knowledge worker of the plurality of knowledge workers the system updates and renders initially to the user a predetermined portion of the data map report, the predetermined portion of the data map report being those portions of the data map report associated with the one or more selections made by the knowledge worker of the plurality of knowledge workers; and
- either subsequently updates and renders the remainder of the data map report or awaits a user request to update and render the remainder of the data map report.

9. The method according to claim 1, wherein the computer executable instructions when executed by the one or more microprocessors configure the system to:
- provide a network ingestion service which queries a data source connector of a plurality of data source connectors;
- receive a response from the data source connector of the plurality of data source connectors;
- evaluate with the network ingestion service the response from the data source connector of the plurality of data source connectors against a plurality of policies and a system of record to determine differences;
- transmit to the data source connector of the plurality of data source connectors references to items evaluated to have differences;
- capture with the data source connector of the plurality of data source connectors the items associated with the references;
- store within the cloud storage repository the captured items; and
- update the access control information.

10. The method according to claim 9, wherein the data source connector provides for:
- interfacing with the cloud storage repository; and
- handling calls from the cloud storage repository for content; and the cloud storage repository supports at least one of directly and indirectly through other cloud storage repositories all of the policies and other capture logic, the user interface(s), and associated system(s) of record.

11. The method according to claim 1, wherein the computer executable instructions when executed by the one or more microprocessors configure the system to:
- detect a change relating to a permission of at least one of a portion of the data and an object within a data source of the plurality of data sources and update associated permissions relating to the at least one of the portion of the data and the object in the cloud storage repository;
- detect a change in a folder name within a data source of the plurality of data sources and update a corresponding folder name at least one of within the cloud storage repository and within an index stored within the cloud storage repository associated with the stored at least one of data and objects from the plurality of data sources within the cloud storage repository.

12. The method according to claim 1, wherein the computer executable instructions when executed by the one or more microprocessors configure the system to:
- record a point-in-time;
- restore a predetermined subset of the plurality of data sources from the cloud storage repository to a user; wherein
- the predetermined subset of the plurality of data sources are restored as of the point-in-time;
- elements associated the predetermined subset of the plurality of data sources are replaced within the predetermined subset of the plurality of data sources with the respective elements and states at the selected point-in-time; and
- the elements are at least one of a list of objects, data, folder names, and permissions.

* * * * *